United States Patent
Benjaminsen

(10) Patent No.: US 8,728,364 B2
(45) Date of Patent: May 20, 2014

(54) OPEN CELL FOAM AND MANUFACTURE OF OPEN CELL FOAM PRODUCTS

(75) Inventor: Edward Benjaminsen, Westminster, MD (US)

(73) Assignee: Senstat Products & Technologies, Inc., Westminster, MD (US)

( * ) Notice: Subject to any disclaimer, the term of this patent is extended or adjusted under 35 U.S.C. 154(b) by 152 days.

(21) Appl. No.: 12/601,070

(22) PCT Filed: Jul. 9, 2008

(86) PCT No.: PCT/US2008/069486
§ 371 (c)(1),
(2), (4) Date: Nov. 20, 2009

(87) PCT Pub. No.: WO2010/005432
PCT Pub. Date: Jan. 14, 2010

(65) Prior Publication Data
US 2011/0098373 A1      Apr. 28, 2011

(51) Int. Cl.
*B29C 44/34*      (2006.01)

(52) U.S. Cl.
USPC .............. 264/51; 264/413; 264/415; 264/416; 264/36.11; 264/45.1; 264/45.8; 264/46.1; 264/46.2; 264/46.3; 264/48

(58) Field of Classification Search
USPC .............. 264/413, 415, 416, 419, 425, 36.11, 264/37.15, 37.16, 45.1, 46.2, 46.3, 51, 45.8, 264/46.1, 48
See application file for complete search history.

(56) References Cited

U.S. PATENT DOCUMENTS

| | | | |
|---|---|---|---|
| 4,674,976 A | 6/1987 | Naohara et al. | |
| 4,719,039 A | 1/1988 | Leonardi | |
| 4,877,814 A | 10/1989 | Ito | |
| 5,589,519 A | 12/1996 | Knaus | |
| 5,859,076 A | 1/1999 | Kozma et al. | |
| 6,242,503 B1 | 6/2001 | Kozma et al. | |
| 6,325,956 B2 | 12/2001 | Chaudhary et al. | |
| 6,958,365 B2 | 10/2005 | Dontula et al. | |
| 2007/0148432 A1 | 6/2007 | Baker et al. | |
| 2008/0003421 A1* | 1/2008 | Matsumura et al. | 428/219 |

* cited by examiner

*Primary Examiner* — Jeffrey Wollschlager
*Assistant Examiner* — Stella Yi
(74) *Attorney, Agent, or Firm* — Lowe Hauptman & Ham, LLP

(57) ABSTRACT

A foam form sheet material having a first large surface comprising substantially only closed cells and an opposite large surface and an interior comprising substantially only open cells. This material comprises a cross linked olefin thermoplastic polymer or copolymer. The foam is made by mixing the polymer with a blowing agent and a cross linking agent. The mixture is maintained in a two roll mill means for a time sufficient to initiate cross linking and to initiate foaming to form closed cells. The sheet material is then disposed in a second two roll mill means having a nip that is larger than the thickness of the foamed sheet material and maintained under elevated temperature and pressure sufficient to initiate further cross linking and foaming. The fully cross linked cell foam is then compressed to rupture the closed cells that are disposed in the interior to form open cells.

16 Claims, 1 Drawing Sheet

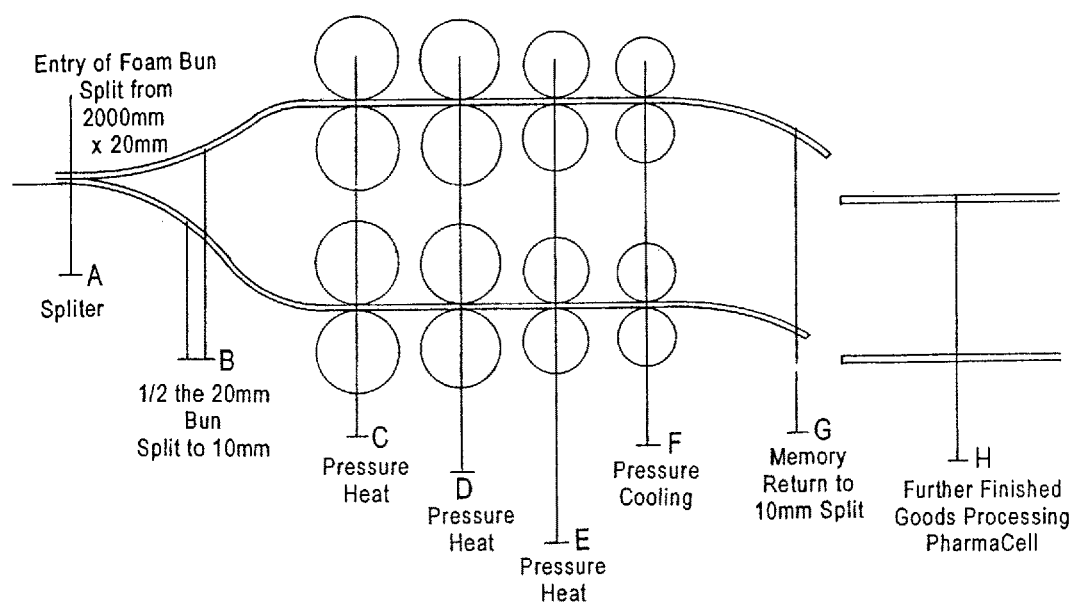

OPEN CELL FOAM AND MANUFACTURE OF OPEN CELL FOAM PRODUCTS

CROSS REFERENCE TO RELATED APPLICATIONS

The present Application is the U.S. National Stage of International Application No. PCT/US08/69486, filed on Jul. 9, 2008, and published in the English language. This application is hereby incorporated by reference in its entirety into the present application.

FIELD OF THE INVENTION

This invention is directed to novel open cell foam polymeric products and a novel method of manufacturing such products. It more particularly refers to such products that comprise cross linked olefin polymers and/or copolymers that have a fine and substantially consistent open cell structure. These products also have a consistent bulk density throughout their thickness in the range of at least about 20 to 40 kg per cubic meter. In particular, the products of this invention are initially made in an open foam sheet configuration.

BACKGROUND OF THE INVENTION

The art is replete with foam forming polymer technology. In most cases, the previously disclosed technology is aimed at the direct manufacture of open or closed cell foam form products, such as sheets, egg crates, fast food containers or the like. In most cases, the foam is produced from a suitable foam forming thermoplastic polymer, such as polystyrene, polyethylene, polypropylene, an ethylene/propylene copolymer, an ethylene/vinyl acetate copolymer or the like. Such a thermoplastic polymer is admixed with a blowing agent and, in some cases, a cross linking agent, at elevated temperature and pressure conditions sufficient to render the polymer fluid enough to be able to be thoroughly mixed with the blowing agent and the cross linking agent. This blending has in the past often been carried out in an extruder. After thorough blending this admixture in an extruder, it is suitably expelled from the extruder through a conventional dye under conditions that involve a sudden and significant drop in pressure sufficient to enable the blowing agent to expand and to form voids or closed cells within the body of the fluid polymer composition as it expands through the extruder die. As the blowing agent expands to create voids or closed cells within the extrudate, the entire composition expands and cools whereby trapping the closed cell voids within the polymer composition resulting in a significant reduction in the overall bulk density of the mixture. At the same time that the pressure is dropping, the temperature of the mixture is also reduced so as to enable the foam form material to solidify. If the pressure drop across the extruder die is sufficient, and if there is enough blowing agent in the mixture, the cells that are formed have an open cell structure; that is the cells are interconnected to each other. Thus the product so formed is generally porous. If the pressure drop is lower or if there is less blowing agent in the composition, the end product may have a closed cell structure; that is the cells are each independent and isolated from other cells by means of the cell walls. It is to be noted that while the cells are being formed, the composition is maintained under conditions that enable the cross linking agent to convert at least a portion of the thermoplastic olefin polymer into a cross linked material that has substantially stronger cell walls. The stronger cell walls tend to cause the cells to have a closed cell structure.

Generally, these manufacturing methods that have been used in the art employ at least one inflammable chemical as a blowing agent wherefore reuse of the waste portions of the cellular product composition and recapture of excess material resulting from carrying out this method has been significantly limited. Further, depending on the composition of the polymer being used, burning of the foam form product can produce toxic gases, such as cyanide, and often sends many other pollutants into the atmosphere. Other problems with existing open cell foams include poor inter-connectivity, weak structural form and uneven size of the open cells. More particularly, conventionally there is a wide variability in cell structure between the interior portion of a foam sheet product as compared to the cell structure of a surface portion of the sheet. Because of this wide variability, it is difficult to make an open cell product that has consistent absorptivity of fluids, compression set and strength, elongation to break, tensile strength, and shear strength. Further, the open cell foam form products that are known in the prior art are limited in their color penetration and in their visual performance. These adverse characteristics have limited the industrial use of these open cell foam form sheet products because it is difficult, if not impossible, to accurately and reproducibly control the size of open cells of the foam form material made according to the prior art. In particular, it is substantially impossible to specify particular characteristics such as fluid, (that is gas and liquid) retention, fluid flow or pressure drop across the thickness of the cellular products of the prior art as a function of cell size because open cell foam structures as made by prior art techniques tended to have very uneven cell sizes.

In addition, the liquid retention characteristics of the prior commercially available open cell foam materials have not found great use in filtration operations because of the inconsistency and unpredictability of the size of the open cells in the products that have been formed according to prior art techniques. In order to accomplish wide spread industrial use of foam form products with open cellular structure, such products must have a relatively constant flow of fluids (liquids or gases) throughout their structure. That is, they must have a consistent fluid pressure drop across all portions of the foam form product. An open cell structure with consistent cell geometry is required to enable these products to absorb, separate, control and/or retain fluids that come into contact with them. In order for open cell products to be used for clean up of fluid spills, the open cell structure has to enable the absorption of spilled fluids at a consistent rate and volume and retain them in a consistent manner subject to their being expelled from the foam, such as by mechanical squeezing.

In the past, open cell foam products that have been made by expelling a polymer/blowing agent composition from an extruder die have been structurally relatively weak because it has been difficult if not impossible to make the open cells substantially uniform in cell wall thickness. The distribution of blowing agent throughout the molten, pressurized polymer composition has been found to be uneven and therefore the cells produced are of uneven size and wall strength.

Reference is here made to U.S. Pat. Nos., 5,589,519, 5,859, 076 6,242,503, 6,325,956, 6,958,365 and published application Ser. No. 11/314,576 that generally describe the state of the prior art related to the manufacture of open cell products. Further reference is made to expired U.S. Pat. No. 4,877,814 that shows a process of making open cell foam form sheets that is similar to the instant process. Other and additional references in the prior art will be cited as they become available.

OBJECTS OF THE INVENTION

It is an important object of this invention to introduce a novel means of making open cell foam form sheet materials that are suitable for use in filtration and general fluid absorption activities.

Consistent with using such novel means to produce such open cell foams, it is another object of this invention to provide an open cell foam form sheet material having consistent and reproducible porosity and fluid retention capabilities.

It is a further object of this invention to provide an open cell sheet form product having very consistent cell sizes and cell wall dimensions and strengths.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

GENERAL DESCRIPTION OF THIS INVENTION

In accord with and fulfilling these objects, one important aspect of this invention is a new method of making an open cell foamed sheet product having the desired properties set forth above. Contrary to batch methods for the formation of closed or open cell foam sheeting disclosed in the prior art, the instant method comprises a continuous series of steps as follows:

forming an initial composition comprising an admixture of at least one generally resilient thermoplastic olefinic polymer or copolymer, at least one cross linking agent and at least one blowing agent;

melting said polymer composition;

continuously admixing together said molten polymer, the aforesaid blowing agent and the aforesaid cross linking agent to form an initial fluid composition having an elevated temperature and pressure sufficient to enable the polyolefin to become cross linked and sufficient to provide for incipient void cell formation upon decreasing the pressure that is being held on the initial fluid composition;

continuously exposing the heated and pressurized initial composition to a first continuous pressurizing means, and continuously maintaining the initial composition at a pressure and temperature sufficient to maintain the initial composition in fluid form, to maintain said blowing agent in a condition whereby closed cell formation is incipient but not yet fully completed and wherein cross linking has not as yet been completed to an extent that is sufficient to limit the further reaction of the cross linking agent with the polyolefin within the closed cell walls;

continuously releasing a portion of the pressure on said initial composition by an amount sufficient to enable said blowing agent to create a sheet having a first thickness while at the same time continually initiating the formation of closed cells within the sheet and initiating cross linking of the polyolefin in the closed cell walls whereby forming an initial foam form sheet having substantially the same bulk density across its thickness having a first thickness and comprising closed cell voids having substantially similar cell geometry;

while maintaining the fluidizing temperature and pressure of the initial foam form sheet, comprising a plurality of closed cells having cross linked cell walls, continuously subjecting said initial foam sheet material to a further reduction in pressure along with the application of further elevated temperature sufficient to complete the cross linking of the polyolefin cell walls and causing the formation of further closed cells and/or the enlargement of said previously formed closed cells having cross linked walls, for a time and at a temperature sufficient to cause substantially all of the blowing agent to be used to complete the formation of closed cells. At the same time using substantially all of the cross linking agent to complete substantial cross linking of the closed cell walls while continuously retaining said foam form sheet material within enlarged constraints and maintaining the large surfaces of said foam form sheet in a skin condition with substantially no open cells being disposed on said surfaces;

substantially continuously subjecting at least one of the outside longitudinal skin surfaces of said closed cell containing foam form sheet material having said second thickness to mechanical compression under conditions sufficient to maintain the cells making up the longitudinal outside surfaces of said sheet material in a closed cell form while compressing the interior of said foam form sheet sufficient to rupture at least a substantial portion of the walls of the closed cells disposed in the interior of said foam form sheet and away from said outside surfaces to thereby convert substantially all of said interior closed wall cells to open walled cells and causing said foam form sheet material to have a third thickness;

releasing at least a part of said compression under conditions sufficient to enable said compressed foam form sheet having a third thickness to at least partially expand sufficient to cause it to revert to a foam form sheet material having a thickness that is greater than said third thickness but not greater than said second thickness; and longitudinally slicing said foam form sheet material to produce at least two form foam sheet materials each having a first longitudinal side comprising a skin made up substantially of only closed cells and having a second longitudinal side opposite to said first longitudinal side comprising substantially only the exposed walls of open cells wherein both said open and closed cells have a substantial amount of cross linked walls.

In another embodiment of this invention, the step of subjecting the fully foamed sheet to compression in order to convert the closed cells to an open cell structure can be carried out under conditions that enable the surfaces of the foamed sheet to also convert from a closed cell structure to an open cell structure. Carrying out the method of this invention in this manner enables the open cell product so produced to be used as a filter whereby fluid form material is enabled to pass through the open cell foam product while trapping solid material being carried by the fluid that is passing through the foam sheet.

BRIEF DESCRIPTION OF THE DRAWINGS

The present invention is illustrated by way of example, and not by limitation, in the figures of the accompanying drawings, wherein elements having the same reference numeral designations represent like elements throughout and wherein:

The sole FIGURE schematically depicts the process according to one aspect of the invention.

DETAILED DESCRIPTION OF THE INVENTION

This invention envisions a continuous operation in which an initial composition made up of a desired thermoplastic olefin polymer, a foaming agent and a cross linking agent are heated and thoroughly admixed together for a time sufficient to form a first intermediate product. The foaming agent and the cross linking agent portions of the first intermediate product are then subjected to decomposition whereby a substantial number of closed void cells are formed, but wherein all of the foaming and cross linking components of the first intermediate product are not decomposed, to form a second intermediate product. While maintaining the first intermediate product at foam forming and cross linking conditions, thereby causing the cross linking and foam forming portions of the second intermediate product to be decomposed whereby the formation closed cell foam and cross linking operations are then completed to form a second intermediate product. The third step is to subject the second intermediate product to compression at a temperature of up to about 40° C. sufficient to rupture the closed void cells and to thereby produce a third intermediate product that has large surfaces that comprise skin and an internal volume comprising substantially open cells. It is to be noted that in some embodiments of this invention the second intermediate product is a sheet material having two opposing surfaces comprising skin type structure with few if any closed cells protruding though the skin. In other embodiments of this invention, a skin material that is compatible with the surface composition of the second intermediate product is laminated to the surface(s) of the second intermediate product before or after laminating the non-cellular material to the large external surfaces of the sheet.

It is important to note that according to the most preferred embodiment of this invention, the above sequential method steps are carried out continuously. In the prior art, there are disclosures of similar methods where the sequential steps are carried out batchwise. In the prior art, the first intermediate composition is introduced into a constraining molding structure. This initial composition is partially foamed in this first constraining molding structure to form the second intermediate composition whereupon it is removed from the molding structure and introduced into a second, larger constraining molding structure in which the foaming operation is continued until substantially all of the foaming and crosslinking materials are fully decomposed and "used up". This sheet of cellular material is filled with closed cells to thereby form a closed cell foam. Lastly, the closed cell sheet is removed from the second larger constraining molding structure and subjected to compression at relatively low temperatures that cause the rupture of the closed cells to form an open cell sheet.

The instant invention departs from the prior art as discussed in two very important ways. First, the instant invention does not employ constraining molding structures. Rather, the instant method envisions a continuous operation in which the initial composition is subjected to compression by a series of roller pairs having different gap widths. The gap widths decrease in a downstream direction. That is, the first set of roller pair(s) that engage the initial composition are at an elevated temperature sufficient to initiate foaming and cross linking to a limited extent and to cause the formation of closed cells within the partially cross linked material. The next set of roller pairs has larger roller gaps thereby enabling and encouraging the first intermediate, partially foamed and partially cross linked material to further crosslink while forming additional closed cells. This completes the foam forming and cross linking operations. The next and last set of roller pairs has a narrow roller gap whereby enabling substantial compression to be applied to the fully foamed and cross linked intermediate product. The compression that is thus applied to the fully foamed and cross linked sheet is sufficient to rupture the closed cells and convert this closed cell foam into an open cell foam that may have a non-foam skin. As an alternative, it is considered to be within the scope of this invention to produce a foam form material with open cell surfaces and to the laminate a non-foam skin onto the large surfaces of the open cell foam sheet rather than to rely solely on the compression rollers to insure that the large surfaces are substantially free of void cells.

Upon completion of the formation of the open cell foam form sheet material, the sheet is subjected to a longitudinal slicing operation whereby a single open cell foam sheet is converted into at least two thinner sheets each having a non foam skin on one large side and an open cell foam structure on the opposite side. The interior of these sheets is constituted of open cells having cross linked interior open cell walls. In another embodiment of this invention, the foam form sheet comprising open cells may be longitudinally sliced into a plurality of open cell foam sheet and these open cell foam sheets may then have a non foam skin laminated to one side (or both sides) of the sheet.

It has been found that subjecting the initial composition to a continuous foaming and cross linking operation in a continuous sequence produces more uniform cell geometry. Because the closed cells created in the first stage of this method have very consistent physical dimensions and properties, when these cells having crosslinked walls are crushed and broken into open cells, the now, open cells retain their substantially identical dimensions and other properties. This is not possible when the cells are initially formed directly in an open cell condition. Therefore, the initial formation of the cells in a closed condition followed by conversion to an open condition by a crushing technique provides a much more uniform and usable product.

Polyolefin polymers are most desirably used in the instant invention. Examples of such materials are: polyethylene, polypropylene, polystyrene, polyvinyl chloride and ethylene-vinyl acetate copolymer or the like. These polymers are per se well known in the plastics art. Suitable cell forming (foaming) agent are also per se well known. An example of such foaming material is azodicarbonamide: that is per se well known. Other foaming agents include zinc stearate, an unsaturated hydrolyzable silane, methyl chloride, butane or other low molecular weight hydrocarbons. Cross linking agents are also per se well known. Examples of these materials include dicumyl peroxide and other peroxides. The instant method includes maintaining close control over the operating parameters such as temperature and pressure. In the first foaming step, the temperature should be maintained at about 110 to 135° C. In the second foaming step the temperature should be maintained at about 150 to 190°.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

What is claimed is:

1. A method of forming a foam form sheet material comprising open cells comprising:

heating and admixing at least one thermoplastic olefin polymer, at least one foaming agent, and at least one crosslinking agent for a period of time sufficient to form a first intermediate product;

substantially continuously engaging the first intermediate product through the nip of a first pair of rollers under conditions sufficient to partially decompose the at least one foaming agent and the at least one cross linking agent to form a second intermediate product having closed void cells, wherein less than all of the at least one foaming and the at least one crosslinking agent of the first intermediate product are decomposed, and wherein the first pair of rollers have a first gap width;

substantially continuously engaging the second intermediate product through the nip of a second pair of rollers under conditions sufficient to further decompose the at least one foaming agent and the at least one cross linking agent to form a third intermediate product having more closed void cells than the second intermediate product, and wherein the second pair of rollers have a second gap width greater than the first gap width;

substantially continuously compressing the third intermediate product at a temperature of up to about 40° C. and under conditions sufficient to rupture the closed void cells and to thereby produce a foam form sheet material having surfaces comprising a skin and an internal volume comprising substantially open cells.

2. The method of claim 1, wherein the substantially continuously compressing the third intermediate product comprises substantially continuously engaging the third intermediate product through the nip of a third pair of rollers at a temperature of up to about 40° C. and under conditions sufficient to rupture the closed void cells and to thereby produce a foam form sheet material having surfaces comprising a skin and an internal volume comprising substantially open cells.

3. The method of claim 1, wherein the substantially continuously compressing the third intermediate product comprises substantially continuously laminating a non-foam skin onto the surface of the third intermediate product at a temperature of up to about 40° C. and under conditions sufficient to rupture the closed void cells and to thereby produce a foam form sheet material having surfaces comprising a skin and an internal volume comprising substantially open cells.

4. The method of claim 1, wherein a skin material that is compatible with the surface composition of the third intermediate product is laminated to a surface of the third intermediate product.

5. The method of claim 1, wherein the third intermediate product is a sheet material having two opposing surfaces comprising a skin type structure having few if any cells protruding though the skin.

6. The method of claim 1, wherein said thermoplastic olefinic polymer or copolymer comprises at least one member selected from the group consisting of polystyrene, polyethylene, polyvinyl chloride, polypropylene and copolymers comprising at least one of said olefins.

7. The method of claim 1, wherein the thermoplastic olefinic polymer or copolymer comprises ethylene-vinyl acetate copolymer.

8. The method of claim 1, wherein said at least one blowing agent comprises azodicarbonamide.

9. The method of claim 1, wherein the first pair of rollers is adapted to restrain the first intermediate product.

10. The method of claim 1, wherein the second pair of rollers is adapted to restrain the second intermediate product.

11. The method of claim 1, wherein the foam form sheet material having surfaces comprising a skin and an internal volume comprising substantially open cells has open cells in an amount greater than or equal to 95% of the cells.

12. The method of claim 1, wherein the first pair of rollers is adapted to impart a temperature of about 70° C. to 135° C. to the first intermediate product.

13. The method of claim 1, wherein the second pair of rollers is adapted to impart a temperature of about 150° C. to 190° C. to the second intermediate product.

14. The method of claim 1, further comprising longitudinally slicing the foam form sheet material having surfaces comprising a skin and an internal volume comprising substantially open cells to produce at least two foam form sheets each having one longitudinal side comprising a skin comprising substantially closed cells and having an opposite longitudinal side and an interior having substantially open cells.

15. The method of claim 1, wherein, in the at least two foam form sheets, both the open cells and the closed cells have cross linked walls and substantially the same degree of porosity.

16. A method of forming a foam form sheet material comprising open cells comprising:

heating and admixing at least one thermoplastic olefin polymer, at least one foaming agent, and at least one crosslinking agent for a period of time sufficient to form a first intermediate product;

substantially continuously engaging the first intermediate product through the nip of a first pair of rollers under conditions sufficient to partially decompose the at least one foaming agent and the at least one cross linking agent to form a second intermediate product having closed void cells, wherein less than all of the at least one foaming and the at least one crosslinking agent of the first intermediate product are decomposed, and wherein the first pair of rollers have a first gap width;

substantially continuously engaging the second intermediate product through the nip of a second pair of rollers under conditions sufficient to further decompose the at least one foaming agent and the at least one cross linking agent to form a third intermediate product having more closed void cells than the second intermediate product, and wherein the second pair of rollers have a second gap width greater than the first gap width;

substantially continuously compressing the third intermediate product at a temperature of up to about 40° C. and under conditions sufficient to rupture the closed void cells and to thereby produce a foam form sheet material having surfaces comprising a skin and an internal volume comprising substantially open cells;

wherein the substantially continuously compressing the third intermediate product comprises substantially continuously engaging the third intermediate product through the nip of a third pair of rollers at a temperature of up to about 40° C. and under conditions sufficient to rupture the closed void cells and to thereby produce a foam form sheet material having surfaces comprising a skin and an internal volume comprising substantially open cells;

wherein the first pair of rollers is adapted to impart a temperature of about 70° C. to 135° C. to the first intermediate product; and wherein the second pair of rollers is adapted to impart a temperature of about 150° C. to 190° C. to the second intermediate product.

\* \* \* \* \*